United States Patent
Jancso et al.

(10) Patent No.: US 8,334,479 B2
(45) Date of Patent: Dec. 18, 2012

(54) SYSTEM FOR HIGH-DYNAMIC 3D MACHINING OF A WORKPIECE BY MEANS OF A LASER BEAM

(75) Inventors: Alex Jancso, Jena (DE); Thomas Doering, Sulza (DE); Jean Pierre Bergmann, Erfurt (DE); Andreas Patschger, Jena (DE); Michael Nittner, Camburg (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 508 days.

(21) Appl. No.: 12/615,492

(22) Filed: Nov. 10, 2009

(65) Prior Publication Data

US 2010/0116796 A1    May 13, 2010

(30) Foreign Application Priority Data

Nov. 10, 2008 (DE) .......................... 10 2008 056 712

(51) Int. Cl.
*B23K 26/14* (2006.01)
(52) U.S. Cl. ......... 219/121.67; 219/121.74; 219/121.78; 219/121.79
(58) Field of Classification Search ............. 219/121.67, 219/121.68, 121.74, 121.75, 121.76, 121.78, 219/121.79
See application file for complete search history.

(56) References Cited

U.S. PATENT DOCUMENTS

| | | | | |
|---|---|---|---|---|
| 4,825,036 A | * | 4/1989 | Bickel et al. | 219/121.78 |
| 4,855,565 A | * | 8/1989 | Thomas et al. | 219/121.79 |
| 5,034,618 A | | 7/1991 | Akeel et al. | |
| 5,059,759 A | * | 10/1991 | Kudo et al. | 219/121.78 |
| 2002/0148819 A1 | * | 10/2002 | Maruyama et al. | 219/121.78 |
| 2005/0150876 A1 | | 7/2005 | Menin et al. | |
| 2007/0221639 A1 | * | 9/2007 | Yoshikawa | 219/121.63 |

FOREIGN PATENT DOCUMENTS

| | | |
|---|---|---|
| DE | 43 35 367 C2 | 4/1994 |
| EP | 0 440 002 B2 | 9/1999 |
| EP | 1 579 962 B1 | 4/2008 |
| FR | 2847187 | 5/2004 |

* cited by examiner

*Primary Examiner* — Khiem D Nguyen
(74) *Attorney, Agent, or Firm* — Duane Morris LLP

(57) ABSTRACT

The system comprises a buckling arm robot with a robot frame (1) and an articulated arm (2) and a fiber optic cable (5) which is connected to one end of the articulated arm (2) and through which a laser beam (11) with a beam axis (10) is coupled into the articulated arm (2) in the direction of a first axis of the articulated arm (2). The fiber optic cable (5) is indirectly connected to the stationary end of the articulated arm (2) via an alignment unit (6) which comprises a collimating lens system (13) and at least two alignment mirrors (12.1, 12.2), each of which mirrors can swivel about at least one axis of rotation and move along at least one axis of translation, with the axes of rotation and the axes of translation being disposed at right angles to each other so that the beam axis (10) of the laser beam (11) can be made to coincide with the optical axis (4).

5 Claims, 2 Drawing Sheets

SYSTEM FOR HIGH-DYNAMIC 3D MACHINING OF A WORKPIECE BY MEANS OF A LASER BEAM

FIELD OF THE INVENTION

The present invention relates to a system in which a laser beam that is transmitted through a fiber optic cable is guided by an articulated arm of a robot to a workpiece that is to be machined. This type of system is generically known from the German Patent DE 43 35 367 C2.

BACKGROUND OF THE INVENTION

Three-dimensional machining of components (subsequently referred to as workpiece) is increasingly gaining importance in manufacturing, especially for welding of near net shape components or for trimming and paring down components after a re-forming procedure.

Especially in cases in which the surfaces or contours of a workpiece that are to be machined with a laser beam are not located within a plane (subsequently referred to as 3D contours), the use of buckling arm robots, the motion sequence of which can be freely programmed, offers considerable freedom of design, accompanied by lower capital expenditure and acceptable manufacturing accuracy.

In the power range above 1 kW, machining of 3D contours of a workpiece by means of buckling arm robots and a laser beam is carried out predominantly by solid-state lasers (YAG, diode or fiber lasers). Laser beams of this type of laser can be guided to good advantage even over a length of several meters through a fiber optic cable comprising one or a plurality of optical fibers, which obviously opens up the opportunity to guide the laser beam via a fiber optic cable to the robot hand on the outside of the robot arm, in which robot hand a machining lens system for focusing the laser beam onto the workpiece is disposed.

Regardless of whether the laser radiation exiting from a laser source is guided via only one optical fiber or via a plurality of optical fibers that are assembled in a fiber optic cable, laser radiation is here intended to refer to a laser beam with a beam axis.

PRIOR ART

The German Patent DE 43 35 367 C2 discloses a robot hand for 3D machining of workpieces. On one hand axis, which constitutes the fourth axis of a five-axis robot, a connector for a plug is said to be disposed on the fiber optic cable. The connector can be a plug-and-socket connector or a screw-in connector.

To protect the fiber optic cable against mechanical overload, the cable is protected, e.g., by a spiral sheath. An optical lens system is said to be integrated into the plug, by means of which optical lens system the laser beam is collimated using a prior-art method. It is pointed out that the optical lens system for collimating the laser beam can also be a separate assembly which is disposed outside the fiber-side plug-and-socket connector, i.e., outside the plug.

It is obvious to the person skilled in the art that when the laser beam is coupled in this manner into the hand of a robot, the beam axis of the laser beam which is guided through the optical fibers of the fiber optic cable and the optical axis of the machining lens system of the robot hand do not coincide but are offset and tilted relative to each other depending on the assembly tolerances.

However, since the laser beam travels only a relatively short distance inside the robot arm, which means that the beam path between the end of the fiber and the machining lens system is short, the point of incidence of the laser axis of the laser beam on the machining lens system is still sufficiently close to the pass point of the optical axis so that the laser beam is not obscured within this beam path in the robot hand.

However, the disadvantage of this method of guiding the laser beam to the machining lens system, by means of which the laser beam is focused onto the workpiece is that the fiber optic cable, which follows the movements of the robot arm, is continuously subjected to mechanical stress, even though it does not have to follow the high-dynamic movements of the hand axis. This stress is to be damped by the sheathing; however, the sheathing also restricts the mobility of the optical fibers.

As a rule, optical fibers must not be bent to a bending radius smaller than 150 mm; therefore, when the robot hand travels along highly contoured workpieces, the fibers may be damaged due to kinking.

In addition, fiber optic cables are more sensitive to uncontrolled recoil in the event of high-dynamic movements.

As a rule, damage to optical fibers requires the replacement of the fiber optic cable, which entails costs and downtime. In this context, it should be noted that the distance between the machining site and the laser source can measure several meters, e.g., 50 m, which means that replacing the fiber optic cable, even if it is fitted with a rapid-action coupling connector, is quite time-intensive.

The European Patent EP 1 579 962 B1 discloses a robot for carrying out industrial operations by means of a laser beam, in which the laser beam is guided through an optical fiber which is disposed inside the articulated arm of the robot.

Because of the sensitivity and the small bending radius (100-200 mm) of optical fibers, this type of integration of the optical fiber for guiding the laser beam [into the arm of the robot] is unsuitable for use with high-dynamic robots.

In both above-mentioned prior-art solutions, the fiber optic cable is moved along with the robot arm and thus is subjected to dynamic stresses, which lowers its useful life. It is the weakest link in the beam path and is considered a wearing component.

Optical fibers can serve to transport an infed laser beam or they can operate as lasers themselves, i.e., fiber lasers.

A fiber laser comprises an active fiber, e.g., a glass fiber which is doped with ytterbium or erbium and which is connected to a transport fiber by means of a fusion-bonded connection. Since the length of the active fiber is limited due to the development of undesired side effects, the overall length of the fiber optic cable is invariably determined by the length of the transport fiber to guide the laser beam to the site at which it is to be coupled into a beam bath or to the laser beam's site of action. The active fiber and the transport fiber constitute a nearly monolithic assembly, which means that damage to the transport fiber and subsequent replacement of the transport fiber require that the fusion-bonded connection to the active fiber must be re-established from scratch. To avoid mechanical stress on the transport fiber, this fiber, in practical applications, is connected to a process fiber, and the movement of the fiber optic cable, which cable is thus formed by the sections: active fiber, transport fiber and process fiber, is limited to the section of the process fiber.

The process fiber is a made-to-order fiber which can be easily replaced via a fiber-to-fiber coupling which can be a plug-and-socket connector or a screw-in connector. The fiber-to-fiber coupling, however, leads to a considerably inferior beam quality which, inter alia, is also attributable to an increase in the diameter of the beam. This will be explained by way of an example:

The transport fiber, for example, has a diameter of 50 μm and, because of unavoidable alignment errors and tolerances in the fiber-to-fiber coupling, is coupled to a process fiber with a larger diameter, e.g., 100 μm. With the doubling of the diameter, a four-fold lower beam density across the cross section of the beam results as the beam impinges upon the workpiece, which leads to a reduction of the machining speed and thus to an increase in the cycle time. The overall efficiency of the machining process decreases.

It would therefore be a welcome improvement if the need for integration of a process fiber [into the fiber optic cable] could be eliminated.

A welding robot in which a laser beam within a robot arm is guided via a series of internal mirrors to a head that focuses the laser beam is known from the European Patent EP 0 440 002 B and the [German] translation DE 690 12 307 T3. In this document, no information is given as to how the laser beam is delivered from the laser source to a necessarily required coupling site on the robot arm and how it is coupled in. It may be hypothesized that the intended laser source is a $CO_2$ laser which, compared to laser beams that are guided in optical fibers, emits laser beams with a very high beam quality. Because of the events taking place in the optical fibers, the shape of the beam and the beam caustic are changed in such a manner that a nearly Gaussian distribution of the beam intensity changes into a top head distribution.

OBJECTS OF THE INVENTION

The problem to be solved by the present invention is to make available a system for 3D machining of a workpiece by means of a laser beam, which system operates by using a buckling arm robot and guiding the laser beam through a fiber optic cable, without subjecting the fiber optic cable to mechanical stress.

SUMMARY OF THE INVENTION

The problem posed by the present invention is solved with a system for high-dynamic 3D machining of a workpiece by means of a laser beam, comprising a buckling arm robot with a robot frame and an articulated arm, the stationary end of which arm is attached to the robot frame and on the free end of which arm a machining lens system is disposed, which lens system defines an optical axis, and a fiber optic cable, one end of which cable is connected to the articulated arm and by means of which of which a laser beam with a beam axis is coupled into the articulated arm.

The fiber optic cable is connected to the stationary end of the articulated arm in such a manner that the laser beam is guided through the entire articulated arm. To be able to guide the laser beam with a uniform beam quality through the articulated arm, the end of the fiber optic cable from which the laser beam exists is indirectly connected to the stationary end of the articulated arm via an alignment unit. The alignment unit comprises an collimating leans system and at least two alignment mirrors, each of which can rotate about at least one axis of rotation and move at least along one axis of translation, with the axes of rotation and the axes of translation being at right angles to one another, so that the beam axis of the laser beam can be made to coincide with the optical axis. The fact that the beam axis can always be aligned with respect to the optical axis makes it possible to use commercially available plug-and-socket connectors or screwed connectors to connect the end of the fiber optic cable to the articulated arm.

It is recommended that the connection between the fiber optic cable and the alignment unit be implemented by means of a plug that is disposed on the fiber optic cable and a jack that is disposed on the housing of the alignment unit, which plug and jack together form a rapid-action lock.

Since the fiber optic cable is not subjected to mechanical stress, one advantage is that it can consist only of a fiber laser and a transport fiber or it can even be simply a fiber laser, in which case, contrary to when mechanical stress is exerted, no beam quality-impairing fiber-to-fiber coupling for coupling in an additional process fiber as a wearing component is required.

The alignment unit preferably also comprises a redirecting mirror that can swivel about the third axis of rotation and move along the third axis of translation, thus providing the alignment unit with six degrees of freedom for alignment and allowing the jack on the housing of the alignment group to be disposed at any point.

The lenses of the machining lens system and the lenses of the collimating lens system are preferably translationally movable relative to one another.

By moving the lenses of the machining lens system, it is possible to adjust the focus position for different distances from the machining lens system, which is a prerequisite when workpieces of different thicknesses are to be machined at a constant distance from the workpiece support surface.

By moving the lenses of the collimating lens system, the focal length of the lenses can be adjusted to the divergence of the laser beam at which the laser beam exits the fiber optic cable.

BRIEF DESCRIPTION OF THE DRAWINGS

The present invention will be explained in greater detail based on practical examples and with reference to the drawings. As can be seen.

DESCRIPTION OF THE EMBODIMENTS

Figure 1:
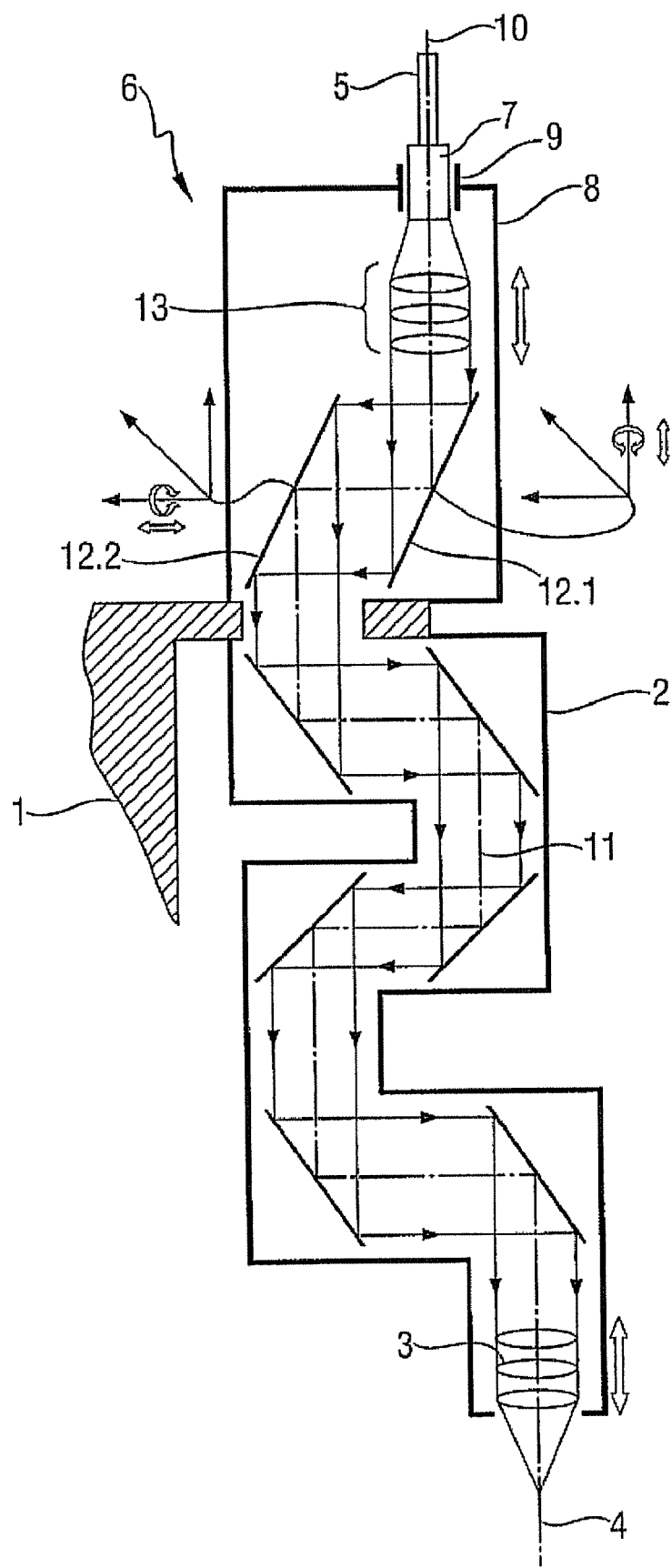
FIG. 1 shows a schematic diagram of a system disclosed by the present invention in a first practical example.

The system shown in FIG. 1 comprises a buckling arm robot with a robot frame 1 and an articulated arm 2 with a plurality of axes, on the free end of which articulated arm a machining lens system 3 is disposed, which lens system defines an optical axis 4 for the beam path inside the articulated arm 2. The other end of the articulated arm 2 is stationarily mounted on the robot frame 1.

The articulated arm 2 is hollow and has a free aperture of, e.g., 30 mm, that extends along its entire length. Mirrors that are positioned inside the articulated arm 2 redirect the laser beam 11 inside the articulated arm 2, with the distance between the mirrors always remaining the same regardless of the movement of the articulated arm 2, thereby guarding against an undesired variation of the beam diameter. The optical axis 4 is redirected via the mirrors and, on the stationary end of the articulated arm 2, is in a stable spatial position in the direction of the first axis of the articulated arm 2, counted from the stationary end, which spatial position is independent of the movement of the articulated arm 2.

One end of the fiber optic cable 5 is indirectly connected to the stationary end of the articulated arm 2 via an alignment unit 6. The design of this alignment unit 6 is intended to ensure that an entering laser beam 11 exiting from the fiber optic cable 5 can be aligned so that the beam axis 10 of the laser beam is made to coincide with the optical axis 4, i.e., is aligned relative to the optical axis, with this optical axis being located in a stable spatial position in the direction of the first axis of the articulated arm 2 on the stationary end of the articulated arm 2.

The connection between the fiber optic cable 5 and the alignment unit 6 is implemented by a plug 7 that is disposed on the fiber optic cable 5 and a jack 9 that is disposed on the housing 8 of the alignment unit 6, which plug and jack together preferably form a rapid-action lock. There are not specific requirements to be met by the mechanical tolerances of the connection since alignment takes place at a later point in time.

Since the end of the fiber optic cable 5 is indirectly connected via rigid connecting elements to the stationary end of the articulating arm 2, the fiber optic cable 5 remains stationary, regardless of the motions carried out by the articulated arm 2, which means that the cable does not move and thus is not subjected to dynamic stress.

As a result, it might be possible to use a fiber optic cable 5 which consists solely of a fiber laser or of a fiber laser and a transport fiber. That is, it might not be necessary to couple in a process fiber which, as a wearing component, can be replaced since the fiber optic cable 5 is not subjected to mechanical stress and consequently not to any considerable wear.

The fiber optic cable 5 can also serve to only transmit the laser beam 11 from a distantly disposed laser source to the buckling arm robot.

The position of the beam axis 10 of a laser beam 11 that exits from the end of the fiber optic cable 5 depends to a large extent on the nature of the end of the fiber optic cable 5 and the connection formed by the plug 7 and jack 9. The necessarily occurring deviation from the position of the beam axis 10 relative to the optical axis 4 in the x-, y- and z-direction and the tilt of the beam axis relative to the optical axis 4 have the effect that if the laser beam 11 were to be coupled directly into the articulated arm 2, the beam would not be guided concentrically with the optical axis 4 through the articulated arm 2.

Given the long path length inside the articulated arm 2 and the multiple redirections on the mirrors that are integrated into the articulated arm 2, the errors would add up. Thus, according to one scenario, parts of the laser beam 11 might no longer impinge upon the integrated mirrors and might be absorbed or reflected by other components of the articulated arm 2 upon which they impinge. Such unwanted absorption would cause the articulated arm 2 to be heated and thus be damaged. Unwanted reflections would impair the beam quality of the laser beam 11.

To be able to guide the laser beam 11 through the articulated arm 2 without increasing the degree of complexity of the connection of the end of the fiber optic cable 5 while maintaining the same uniform beam quality, the beam axis 10 is aligned with the optical axis 4 by means of the alignment unit 6 before the laser beam 11 is guided into the articulated arm 2.

The alignment unit 6 comprises two alignment mirrors 12.1, 12.2 and a collimating lens system 13. The collimating lens system 13 is optically disposed immediately downstream of the end of the fiber optic cable 5 in the direction of the beam, followed by the two alignment mirrors 12.1, 12.2 which, in the direction of the beam, are subsequently followed by the integrated mirrors of the articulated arm 2 up all the way to the machining lens system 3.

The collimating lens system 13 is designed so that, on the one hand, it collimates the divergent laser beam 11 that exits from the end of the fiber optic cable 5, thereby making it possible for the laser beam 11 to be guided as a parallel bundle of rays with a constant beam diameter through the articulated arm 2, and that, on the other hand, it expands the laser beam 11 so that the beam density across the cross section of the beam is adapted to the ability of the integrated mirrors to withstand stress so as to avoid the possibility that these mirrors are overheated and, as a result, deformed.

The collimated laser beam 11 is subsequently redirected via the two alignment mirrors 12.1, 12.2, each of which can move at least about one axis of rotation and one axis of translation.

The two required axes of rotation and the two required axes of translation are at right angles to each other. By appropriately shifting and twisting the alignment mirrors 12.1, 12.2, the beam axis 10 is made to coincide with the optical axis 4.

Figure 2:
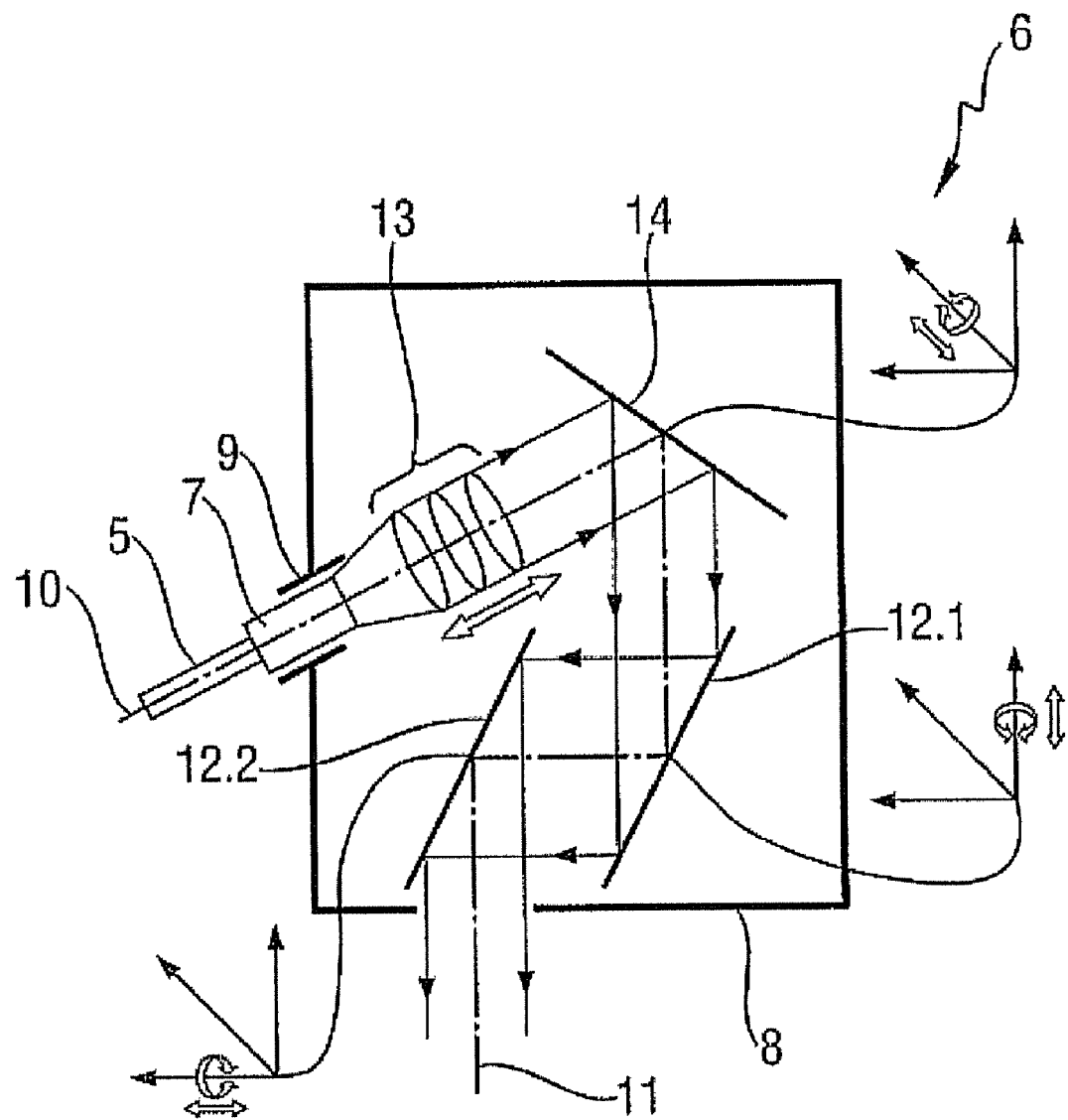
FIG. 2 shows a schematic diagram of an alignment unit of a system disclosed by the present invention in a second practical example.

In a second practical example which is illustrated in FIG. 2, the alignment unit, in addition to the two alignment mirrors 12.1, 12.2, also has a redirecting mirror 14. Thus, in contrast to the first practical example, the jack 9 need not be disposed on the housing 8 of the alignment unit 6 in the direction of the first axis of the robot but can instead be positioned at any point. In this case, the redirecting mirror 14 serves to redirect the laser beam 11 that exists from the end of the fiber optic cable 5 onto the first alignment mirror 12.1. The alignment unit 6, with its two alignment mirrors 12.1 and 12.2 and the redirecting mirror 14, has six degrees of freedom to align the beam axis 10 with the optical axis 4.

At the exit from the robot, i.e., on the free end of the articulated arm 2, the distance between the surface of the workpiece and the free end of the articulate arm 2 which is designed to serve as machining head or cutting tip is controlled by a capacitative or inductive ranging sensor and by the targeted processing of the sensor signal.

The signal which is processed by an analyzing unit is used to change the robot position by transmission at a predetermined time to the robot control.

The control does not take place via an external axis disposed on the robot head, which would only complicate the overall design, but directly via the robot. To ensure lean control and to avoid overshoots, the control strategy provides for a division of the region between the machining head/cutting tip and the surface of the workpiece into a far field and a near field. In the far field region, control takes place based on the distance between the workpiece and the machining head/cutting tip; in the near field region, the percent difference between the machining head/cutting tip and the distance to be maintained (for example, 0.2-2 mm) is used as the control variable.

LIST OF REFERENCE NUMERALS

1 Robot frame
2 Articulated arm
3 Machining lens system
4 Optical axis
5 Fiber optic cable
6 Alignment unit
7 Plug
8 Housing
9 Jack
10 Beam axis
11 Laser beam
12 Alignment mirror 13 Collimating lens system
14 Redirecting mirror While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A system for high-dynamic 3D machining of a workpiece by means of a laser beam, comprising a buckling arm robot with a robot frame and an articulated arm, the stationary end of which arm is attached to the robot frame and on the free end of which arm a machining lens system is disposed, which lens system defines an optical axis, and a fiber optic cable which is connected to the stationary end of the articulated arm so as to be able to couple a laser beam with a beam axis into the articulated arm, characterized in that the fiber optic cable is indirectly connected via an alignment unit to the stationary end of the articulated arm and the alignment unit comprises a collimating lens system and at least two alignment mirrors, each of which can swivel about at least one axis of rotation and move along at least one axis of translation, with the axes of rotation and the axes of translation being at right angles to each other, so that the beam axis can be made to coincide with the optical axis.

2. The system of claim 1, characterized in that the connection between the fiber optic cable and the alignment unit is implemented via a plug that is disposed on the fiber optic cable and a jack that is disposed on the housing of the alignment unit, which plug and jack together form a rapid-action lock.

3. The system of claim 1, characterized in that the fiber optic cable comprises a fiber laser and a transport laser.

4. The system of claim 1, characterized in that the alignment unit also has a redirecting mirror which can be swiveled about the third axis of rotation and moved along the third axis of translation.

5. The system of claim 1, characterized in that the lenses of the machining lens system and of the collimating lens system can be moved translationally relative to one another.

* * * * *